Sept. 15, 1970 G. L. BOELKE 3,529,248
TONE SENSOR
Filed July 23, 1968 2 Sheets-Sheet 1
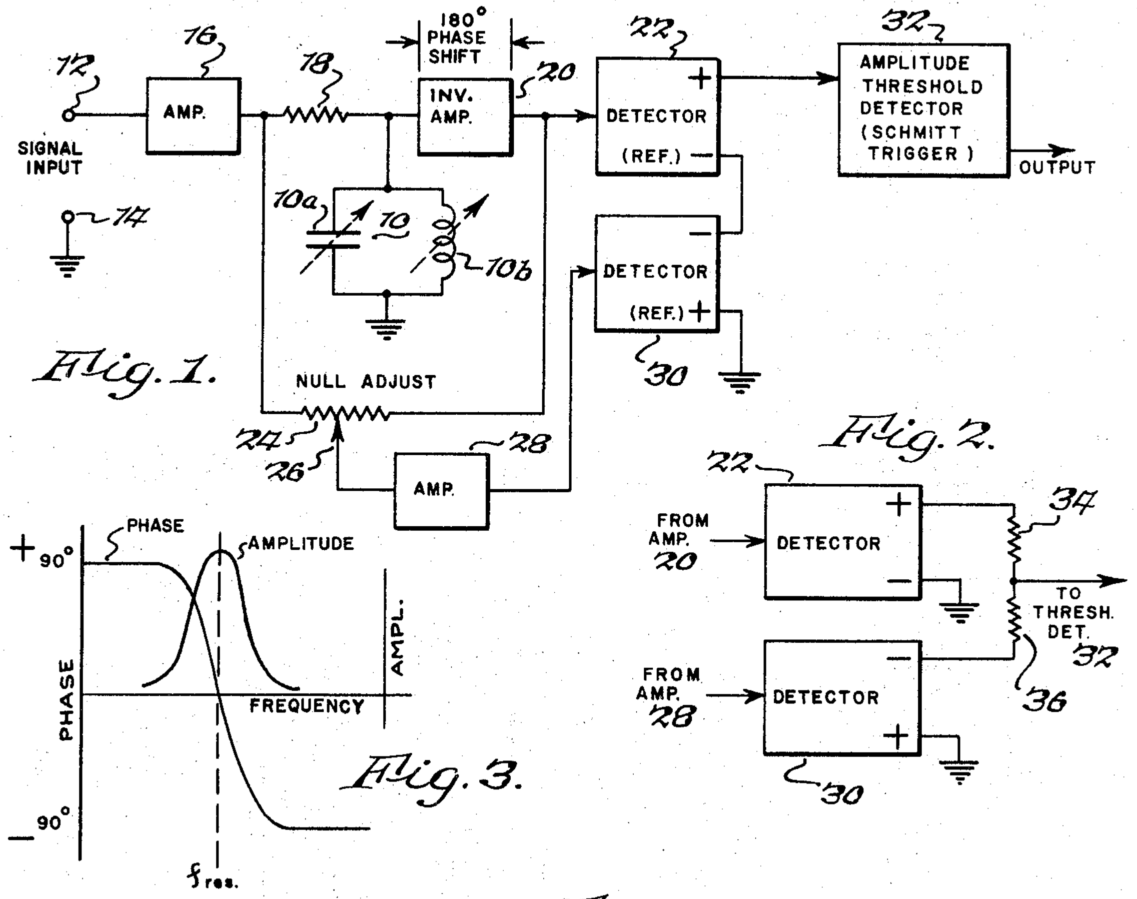
FIG. 1, FIG. 2, FIG. 3
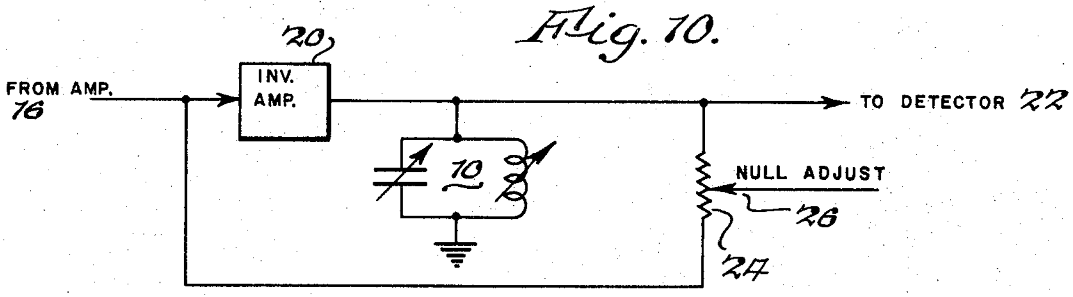
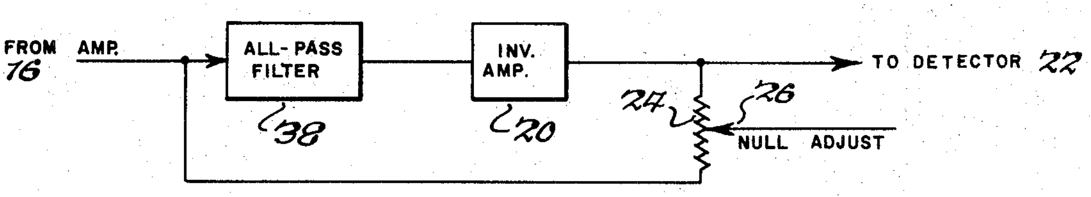
FIG. 11.
INVENTOR.
Gilbert L. Boelke
BY
Edward J. Coleman
AGENT.

INVENTOR.
Gilbert L. Boelke
BY
Edward J. Coleman
AGENT.

United States Patent Office 3,529,248
Patented Sept. 15, 1970

3,529,248
TONE SENSOR

Gilbert L. Boelke, West Seneca, N.Y., assignor to Sylvania Electric Products Inc., a corporation of Delaware Filed July 23, 1968, Ser. No. 746,829
Int. Cl. H03k 9/06
U.S. Cl. 328—140 19 Claims

ABSTRACT OF THE DISCLOSURE

A tone sensing circuit wherein a received signal is applied through a series impedance device to a parallel resonant circuit tuned to select a signal of predetermined frequency and reject all other frequency signals. The output of the parallel resonant circuit is coupled through a phase inverting amplifier to a detector adapted to provide a positive output voltage. The received signal and the output of the inverting amplifier are also connected to respective terminals of a variable resistor having a tap adjusted to the voltage null position for the case where the received signal is a single tone at the predetermined parallel resonance frequency. The variable resistor tap is coupled through an amplifier to a detector adapted to provide a negative output voltage, and the outputs of the two detectors are combined to provide a composite output signal to a threshold detector.

BACKGROUND OF THE INVENTION

This invention relates to tone sensing circuits and in particular to improved means in a voice channel communication system for sensing the transmission of a single tone for remote control purposes.

Tone sensors are employed in a variety of remote control applications. A typical example is the remote operation of a garage door by means of a single frequency tone transmitted from an automobile. A receiver installed in the garage includes a tone sensing circuit which is responsive exclusively to that transmitted signal frequency to operate a motor connected mechanically to the garage door.

An application for which the present invention is particularly useful, however, is to provide a reliable means of sensing single tones transmitted for remote control purposes in a voice channel communication system. For example, transmission of such a control tone is useful for triggering a repeater in a radio receiver. Further, a plurality of tone sensors tuned to select different frequencies can be used in a telephone tone receiver for responding to sequential tones transmitted from a subscriber pushbutton dialing set. In such an application, each toner sensor must discriminate between a single tone of the proper frequency and a complex waveform which may or may not contain the particular frequency to which it is tuned, such as noise or voice, which would intermittently false trigger a simple filter arrangement. Other requirements of the telephone receiver application include, fast response to the desired tone with a non-critical amplitude threshold adjustment, long term stability, and circuit simplicity.

One simple method for providing tone sensing is to employ a parallel resonant circuit which selects the desired frequency and rejects all others, an amplifier for providing signal gain, a peak detector responsive to the signal passed by the resonant circuit, and an amplitude threshold detector which is triggered upon reception of the desired tone. This circuit may be quite useful for applications such as the remote control of a garage door; however, it is clearly unsatisfactory for use in a voice channel receiver since it is subject to false triggering in response to voice components corresponding to the parallel resonance frequency. Increasing the detector time constant provides a solution, but this slows the response time excessively. Further, a critical amplitude threshold adjustment is required since the discrimination is performed on the basis of the amplitude response of the tuned circuit, which even for a high Q circuit is relatively broad with poorly defined frequency cutoff points. This is particularly disadvantageous since the adjustment is subject to drift.

A prior approach for enhancing skirt rejection in the amplitude response characteristic of a tone sensing circuit is described in U.S. Pat. No. 2,159,081. In this case, in addition to employing a main tuner which is resonant at the desired tone signal frequency, a double peak tuner is employed which is resonant at a frequency lying below the signal frequency and also at a frequency lying above the signal frequency. The double peak tuner is arranged so as to oppose the action of the current flowing through the main tuner, thereby providing sharp frequency cutoff points while maintaining a uniform frequency response over a band of the desired width lying between these points. This circuit also has a number of significant shortcomings, however. It is operative to reject signals only at two adjacent frequencies; it requires the adjustment of three tuned circuits; and, there is little or no improvement in resistance to false triggering in response to voice peaks or noise.

U.S. Pat. No. 2,869,123 describes a radio frequency receiver which does provide improved resistance to false signals. The tone sensor comprises two channels each of which receive the audio frequency signal. One channel has an all pass frequency characteristic, while the other channel includes a bridge-T network which sharply rejects the signal of a predetermined tone frequency. The outputs of the two channels are rectified and combined in series in such a manner that the net output when there is no attenuation in either channel is zero. The bridge-T network channel provides a zero output at the tone frequency so that when the receiver input comprises only the desired tone signal, the combined output of the two channel sensor is a voltage of amplitude sufficient to trigger a threshold detector. In the presence of a complex voice waveform, it is clear that the tone rejection channel would produce an attenuated dip in amplitude response at the point where the complex waveform included a frequency component equal to that of the desired tone signal. The result would be a substantially attenuated voltage amplitude response in the combined signal applied to the threshold detector. The amplitude threshold could be adjusted to avoid false triggering under such conditions.

It will be noted, however, that the description in the patent suggests that "to insure against unwanted operation as a result of interference signals, such as those of the familiar 'squeal' or 'whistle' variety, a time delay means may be provided in the circuit leading to (the threshold detector)". A time delay of approximately ½ second is suggested. Hence, this patented circuit does not provide complete rejection of undesired signals, and if a time delay network were used, the response time would be excessively long for many applications. It will also be noted that although this circuit provides a fairly sharp bandpass characteristics, the sensor relies solely on the amplitude characteristic of the bridge-T network for frequency selection. As a consequence, the frequency cutoff points are poorly defined, and a large amplitude signal adjacent to the resonant frequency, but within the passband, could cause a false response. The requisite amplitude threshold setting, therefore, is relatively critical.

SUMMARY OF THE INVENTION

The present invention provides a tone sensing circuit particularly suitable for use in the voice channel receiver of a communication system which is not constrained by the aforementioned limitations of the prior art. The circuit provides extremely good rejection of false signals and excellent response to the desired tone with noncritical amplitude sensing requirements. In addition, this circuit is relatively simple and easily adjusted, and has a sufficiently fast response to make it quite practical for telephone dial pulsing.

Briefly, the tone sensor according to the invention comprises means for developing both peak and null outputs from the same resonant circuit and combining these outputs to provide rejection of unwanted signals. The peak output is provided by applying the input signal to a parallel resonant circuit tuned to selection a signal of a predetermined frequency and reject all other frequency signals. The output of the tuned circuit is coupled to a detector operative to provide a voltage output in response to the amplitude of the tone signal energy passed by the parallel resonant circuit. The null output is obtained by including a 180° phase shift circuit, such as a phase inverting amplifier, between the tuned circuit and the above-mentioned detector. The output of the phase inverter and the input signal are then combined by means of a variable resistor having a tap adjusted to the voltage null position for the case where the received signal is a single tone at the predetermined parallel resonance frequency. To sharpen the null response characteristics, an impedance device is series connected between the signal input and the parallel resonant circuit to isolate the signal input from the phase shift produced by the resonant circuit for all unwanted frequencies. That is, at the tuned circuit parallel resonance frequency, the tuned circuit is in phase with the signal input, but at any other frequency the phase varies rapidly across the passband. This unique approach permits the phase characteristic of the tuned circuit to augment the amplitude characteristic in unbalancing the amplitudes of the signals combined at the variable resistor null tap at unwanted frequencies. As a result, the null dip is much sharper than the frequency-amplitude response characteristic at the output of the tuned circuit. The null tap is coupled through an amplifier to a second detector which is adapted to provide a voltage output of opposite polarity to that of the first mentioned detector. The outputs of the two detectors are then combined and connected to a threshold detector.

If the input signal consists solely of a tone having the frequency at which the parallel resonant circuit is tuned, the output of the peak circuit is maximum and the output of the null circuit is zero. At all other frequencies the null circuit has an output. Upon combining the detector outputs, the composite frequency-amplitude response characteristic is much sharper than that at the output of the resonant circuit, and of particular importance, it has well defined zero response points, thereby significantly enhancing false signal rejection and permitting a wide tolerance of amplitude threshold adjustment. For a complex waveform such as noise or voice, the composite output is always zero or negative, since any signal outside the passband of the tuned circuit tends to cancel the effects of a signal within the passband. As a result of the excellent resistance to false triggering thereby provided, the detectors may be designed to have very short time constants and thus provide the desired fast response characteristic.

In one alternative configuration, the isolation and phase inversion functions are provided by connecting the inverter-amplifier between the signal input and the parallel resonant circuit, rather than at the resonant circuit output. Another alternative approach makes use solely of phase response to obtain frequency selectively by using an all-pass filter in lieu of the parallel resonant circuit.

BRIEF DESCRIPTION OF THE DRAWINGS

The invention will be more fully described hereinafter in conjunction with the accompanying drawings, in which:

FIG. 1 is a combined circuit and block diagram of a tone sensing circuit in accordance with the invention;

FIG. 2 is a combined circuit and block diagram of an alternative circuit arrangement for combining the output voltages of the detectors of FIG. 1;

FIG. 3 is a diagrammatic representation showing typical amplitude and phase response curves for the parallel resonant circuit of FIG. 1;

FIG. 10 is a combined circuit and block diagram illustrating an alternative circuit arrangement in accordance with the invention; and, FIG. 11 is a combined circuit and block diagram of another alternative circuit arrangement in accordance with the invention.

DETAILED DESCRIPTION OF THE INVENTION

Figure 4:
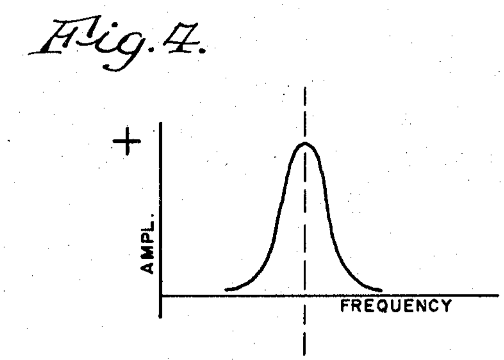
FIG. 4 is a diagrammatic representation showing the typical frequency-amplitude characteristic of the positive voltage output of detector 22 in FIG. 2.

Referring to FIG. 1, a preferred embodiment of the tone sensor according to the invention is shown comprising a single parallel resonant circuit 10 to which an input signal is applied and from which peak and null outputs are obtained for subsequent combination to provide rejection of unwanted signals. The signal input means in this embodiment comprises a pair of input terminals 12 and 14 and a series connected input amplifier 16, terminal 15 being connected to ground. The source of input signals connected to terminals 12 and 14 may comprise an antenna or radio frequency amplifier, a transmission line or telephone wire, or the audio frequency output of the signal detector in a voice channel communications receiver. The output of amplifier 16 is serially connected through a resistor 18 to apply the input signal across parallel resonant circuit 10. The output signal from resonant circuit 10 is coupled through a phase inverter-amplifier 20 to the input of a detector 22 which generates the desired peak output. The null output is obtained by means of a circuit including a variable resistor 24 connected between the output of amplifier 16 and the output of inverter-amplifier 20. Variable resistor 24 has a null adjust tap 26 which is coupled through an amplifier 28 to the input of a detector 30 from which the desired null output signal is obtained.

Parallel resonant circuit 10, which is illustrated as comprising a fixed or variable capacitor 10*a* connected in parallel with a fixed or variable inductor 10*b*, is tuned to anti-resonance, or parallel resonance, at the predetermined frequency for which it is desired that the tone sensor respond. Due to its high impedance at parallel resonance, circuit 10 operates to select the desired predetermined frequency and reject all other frequencies. The typical amplitude response curve for circuit 10 is shown in FIG. 3, the maximum amplitude response occurring at the parallel resonance frequency ($f_{res.}$).

Inverter 20 introduces a 180° phase shift in the output of resonant circuit 10; hence, when receiving a single tone at the predetermined parallel resonance frequency, the input signal and inverter output voltages compared by variable resistor 24 are 180° out of phase. Tap 26 is adjusted to the position at which a voltage null occurs for this case, i.e. the tap position where the 180° phase displaced signals are equal in amplitude. At the parallel resonant frequency, therefore, the input to amplifier 28 is at or near zero, while at all other frequencies, amplifier 28 has an output.

Without resistor 18 (and assuming amplifier 16 has a suitable output impedance), the null response characteristic would be similar to the amplitude response characteristic for resonant circuit 10, shown in FIG. 3, except that it would be inverted. The conventional approach to improve frequency selectivity would be to narrow the bandwidth of the response curve by designing resonant circuit 10 to have a very high circuit Q. According to the present invention, however, a significant improvement in the tone sensor response characteristic is obtained by providing a null dip which is much sharper than the amplitude response characteristic of the high Q resonant circuit 10. This improvement in the null response is obtained by isolating the signal input (at the output of amplifier 16) from the phase response of parallel resonant circuit 10. In FIG. 1, this isolation is provided by a series resistor 18. As a result, the signal output of the resonant circuit will be shifted in phase with respect to the signal at the junction of amplifier 16, resistor 18 and variable resistor 24 for all input signal frequencies different than the predetermined parallel resonance frequency. Thus, as shown by the phase response curve in FIG. 3, at the parallel resonance frequency, the output of resonant circuit 10 is in phase with the signal input, but at any other frequency the phase of the high Q resonant circuit output varies rapidly. More specifically, the phase shift increases to a selected maximum phase shift as the difference between the input signal frequency and the predetermined parallel resonance frequency increases; i.e. for frequencies below $f_{res.}$ the phase shift increases to +90°, and for frequencies above $f_{res.}$ the phase shift increases to −90°. For a brief discussion of these characteristics of a parallel resonant circuit, see "Electronic and Radio Engineering" by Frederick E. Terman, New York, McGraw-Hill Book Company, Inc., Fourth Edition, 1955, pp. 50–57.

When the phase shift ($\phi$) produced by resonant circuit 10 is zero, that is when the input is a single tone equal to the parallel resonant frequency, the deepest null will occur when the position of tap 26 is such that A/A+1 of the total value of variable resistor 24 lies between that tap and the terminal of resistor 24 connected to the output of amplifier 20, A being the total gain of amplifier 20 less any losses due to resistor 18 and tuned circuit 10. When the tap is in this position and $\phi=0$, the 180° phase displaced voltages compared at the tap are equal in amplitude and opposite in polarity so that the input to amplifier 28 is zero. Clearly, if $\phi\neq0$ due to the presence of a signal different than the resonant frequency, even though within the passband of circuit 10, the voltages compared at the tap will have a relative phase displacement of $180°\pm\phi\neq180°$ and, thus, unequal amplitudes. This unbalance will produce a nonzero voltage at the input of amplifier 28. In this manner, therefore, the unique approach of FIG. 1 permits the phase response of the tuned circuit to augment the amplitude response in unbalancing the amplitudes of the signals compared at tap 26 to thereby provide a more selective null response characteristic.

Detectors 22 and 30 may be conventional peak or average detection circuits each comprising an arrangement of diode rectifiers with a load resistor and capacitor each connected across the output so as to provide either a positive or negative voltage output, depending upon which side of the capacitor is connected to ground. Each of these detectors, therefore, may be viewed as having positive and negative output terminals, as denoted in FIGS. 1 and 2, with one output being connected as the reference terminal and the other output being used as the signal output terminal. In this instance, null output detector 30 is adapted to provide a negative output voltage, while detector 22 is adapted to provide a positive output voltage. Hence, the negative terminal of detector 22 is used as its reference terminal, whereas the positive terminal of detector 30 is connected as a reference terminal.

The oppositely polarized outputs of detectors 22 and 30 are combined to provide a composite output signal which is essentially the algebraic sum of the detector outputs. In FIG. 1, the composite signal is obtained by combining the detector outputs in series. More particularly, the reference terminal of detector 30 is connected to ground, and the negative signal output terminal of detector 30 is connected to the reference terminal of detector 22. As a result, the composite output signal is provided at the positive signal output terminal of detector 22, which is coupled to the input of an amplitude threshold detector 32, such as a Schmitt trigger circuit.

An alternative circuit arrangement for combining the output voltages of detectors 22 and 30 to obtain the desired composite output signal is to employ a conventional voltage summing network, as shown in FIG. 2. In this case, the negative terminal of detector 22 and the positive terminal of detector 30 are connected to ground, and the positive output of detector 22 and negative output of detector 30 are connected to respective inputs of a voltage summing circuit comprising resistors 34 and 36, the output of which is connected to threshold detector 32. The values or resistors 34 and 36, each connected in series between its respective detector output and a common output point, are selected such that the algebraic sum of the positive and negative output voltages is provided at the common point.

Figure 5:
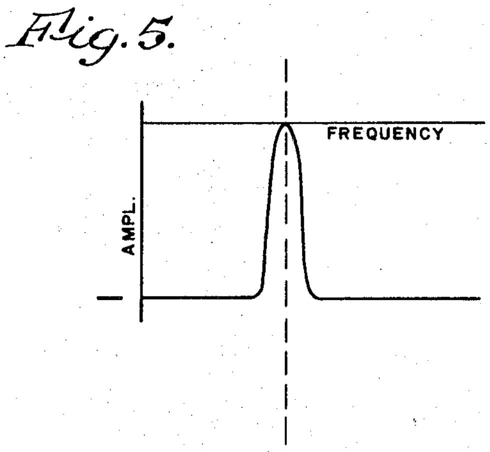
FIG. 5 is a diagrammatic representation showing the typical frequency-amplitude characteristic of the negative voltage output of detector 30 in FIGS. 1 and 2.
Figure 6:
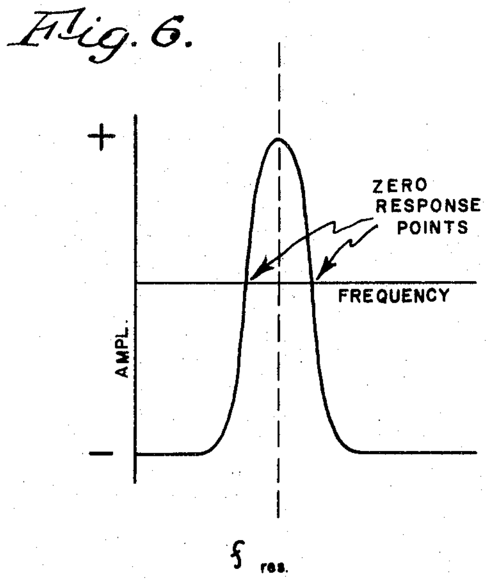
FIG. 6 is a diagrammatic representation showing the frequency-amplitude characteristic of the composite output signal applied to threshold detector 32, namely, the signal at the positive voltage output of detector 22 in FIG. 1, or the signal at the output of the voltage summing network comprising resistors 34 and 36 in FIG. 2.

The typical frequency-amplitude response characteristics of detectors 22 and 30 are shown in FIGS. 4 and 5, respectively, and the frequency-amplitude curve of the combined output signal is shown in FIG. 6. These curves represent the response characteristics for the case where single frequency tones are applied as the input signals. It will be noted that the positive voltage response curve of FIG. 4, which is the characteristic of the positive voltage output of detector 22 in FIG. 2 and the positive voltage contribution of detector 22 in FIG. 1, is the typical amplitude response characteristic of a tuned circuit, having a relative broad bandpass about $f_{res.}$ and poorly defined frequency cutoff points. In contrast, the negative voltage response curve of FIG. 5, which is the characteristic of the negative voltage output of detector 30 in FIGS. 1 and 2, exhibits a much narrower null response about $f_{res.}$. The voltage response of FIG. 5 is zero at the resonant frequency, whereas the positive voltage response of FIG. 4 is maximum at this point. Upon combining the detector output voltages, the resulting composite output signal response curve of FIG. 6, which is the characteristic of the positive output terminal of detector 22 in FIG. 1 and the output of the summing network in FIG. 2, has a much narrower bandpass about $f_{res.}$ than that for detector 22 alone (FIG. 4) with well defined zero response points. Hence, this circuit produces not just an imprrovement in skirt response, but it actually develops zero response frequencies. As a consequence, the net response of the tone sensor has significantly improved frequency selectively and resistance to false triggering, even in the presence of strong unwanted tone frequencies close to the parallel resonant frequency of tuned circuit 10. Even if the circuit is overdriven by a false signal to the point of distortion, it will not respond since the distortion products appear out of the passband and cancel any positive output. These improvements in tone sensor operation are attributable particularly to the unique manner of obtaining a very sharp null response by the use of a phase shift characteristic of the tuned circuit in combination with its amplitude response and to the technique of combining this narrow null resonance with the selective amplitude response of the tuned circuit.

Figure 7:
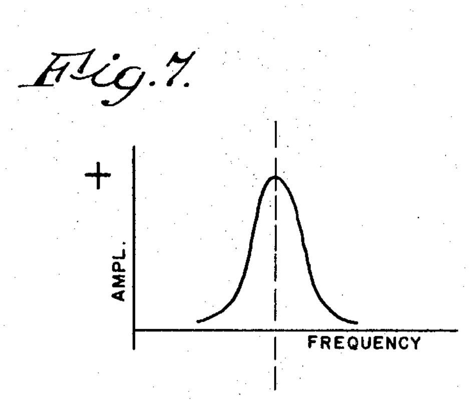
FIGS. 7, 8 and 9 are diagrammatic representations respectively corresponding to FIGS. 4, 5 and 6 for the case where the input signal is a complex waveform; i.e. these curves result when there is always present at least one frequency component outside the passband of the tuned circuit.
Figure 8:
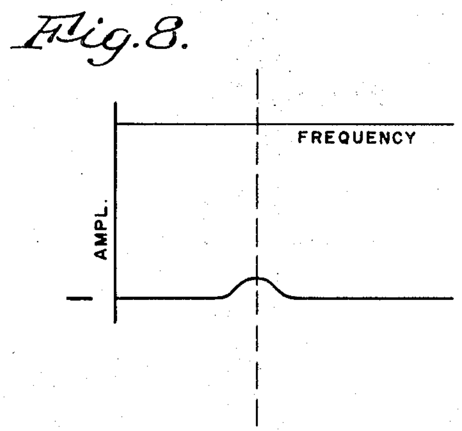
Figure 9:
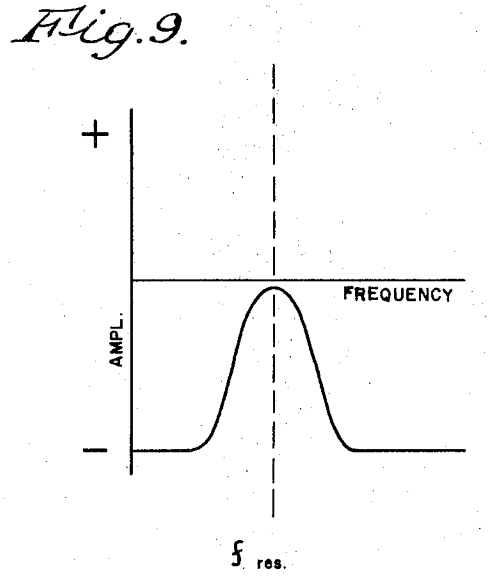

FIGS. 7, 8 and 9 illustrate the response characteristics for the case where the input signal is a complex waveform, such as noise or voice. These curves result when there is always present in the input signal at least one frequency component outside the passband of tuned circuit 10. That is, if two tones exist at the input, one being outside the tuned circuit passband, the response curves of FIGS. 7, 8 and 9 are generated by varying the frequency of the second tone through the passband. The positive voltage response curve of detector 22 is similar to that of FIG. 4, as the parallel resonant circuit will continue to pass the resonant frequency signal energy regardless of the presence of unwanted signal components. In the null circuit, however, the signal energy of the tone outside the passband of the tuned circuit will be unbalanced at the variable resistor 24 tap point and, thus, tend to cancel the balancing effect of the signal energy within the passband. As a result, the negative voltage response of detector 30, shown in FIG. 8, exhibits only a slight dip in a less negative direction in the region of the resonant frequency ($f_{res.}$). By appropriate adjustment of the gain of amplifier 28, therefore, the voltage output of detector 30 (FIG. 8) can be made sufficiently negative so that when combined with the positive output voltage of detector 22 (FIG. 7), the resulting composite output signal response, shown in FIG. 9, will always be negative or zero when the tone sensor is receiving one or more signal frequencies outside the passband of resonant circuit 10. A particularly advantageous result of this characteristic is that detectors 22 and 30 may be designed to have very short time constants, and thus provide the fast response to the desired tone required for applications such as telephone dial pulsing. Further, the output response characteristics exemplified by FIGS. 6 and 9 illustrate the excellent resistance to false triggering provided by the present invention; the circuit will provide a positive response only for a single tone within a narrow passband about the resonant frequency of tuned circuit 10.

The described tone sensor characteristics also provide a wide tolerance of amplitude threshold adjustment for detector 32. Any threshold setting between zero and the anticipated maximum amplitude level, depending upon the desired sensitivity, will provide a tone presence indication at the detector 32 output for an input signal within the narrow passband sharply defined by the zero response points of FIG. 6. The output signal from detector 32 may then be applied for any remote control purpose.

In addition to the aforementioned advantages, the described tone sensing technique is capable of implementation by a relatively simple and economical circuit construction. Further, since the peak and null outputs are developed from the same tuned circuit, the response frequency may be easily adjusted by varying the resonance frequency of a single tuned circuit.

In one typical application, a tone sensor according to the invention was connected at the output of an FM receiver. The composite output signal was strongly negative in response to receiver noise alone, without signal. The output also provided a consistent negative response for a variety of voices tested. With a resonant frequency setting of 2 kc./s., full modulation by a 2 kc./s. sinusoid produced a strong positive response. A reliable response occurred with a signal-to-noise ratio (SNR) of less than 10 db.

When the tone sensor was adjusted to respond to a SNR of unity, it continued to reject successfully a variety of human voices transmitted on the channel; this performance was maintained even when the SNR response adjustment was increased to 40 db. The response time under all conditions was approximately 10 milliseconds.

An alternative circuit arrangement of the invention for achieving similar results is to connect the inverter-amplifier 20, designed to have a suitable output impedance, on the input side the resonant circuit 10 in place of resistor 18, as shown in FIG. 10. Amplifier 20 thereby provides both the desired 180° phase inversion and the required isolation between the output amplifier 16 and tuned circuit 10. The output of the parallel resonant circuit may then be applied directly to detector 22 and one terminal of variable resistor 24.

Another alternative embodiment of the invention, which may be suitable for applications having less stringent performance requirements, is shown in FIG. 11. This implementation differs from FIG. 1 in that an all-pass filter 38 is connected between the output of amplifier 16 and the input of inverter-amplifier 20, in place of resistor 18 and parallel resonant circuit 10. The all-pass filter has a flat amplitude response, i.e. zero attenuation for all frequencies, and a frequency dependent phase response (see "Passive Network Synthesis" by James E. Storer, New York, McGraw-Hill Book Company, Inc., 1957, pp. 134–135, or "Network Analysis and Snythesis" by Franklin F. Kuo, New York, John Wiley and Sons, Inc., 1962, pp. 202–203). Consequently, the FIG. 11 approach makes use solely of the phase response of an electrical network to obtain frequency selectivity. In particular, if the all-pass filter is designed to produce a phase shift ($\phi$) at all frequencies except that of the desired tone, reception of a single tone at the desired frequency will result in the comparison of voltages at tap 26 which are equal in amplitude and 180° out of phase, thereby providing a null output from the tap. If the input signal consists of an unwanted frequency or a complex waveform, the voltages compared at tap 26 will be phase displaced by $180° \pm \phi$; as a result the voltages will be unbalanced, and a nonzero output will be produced at tap 26. The resulting composite outputs from detectors 22 and 30 (not shown in FIG. 11) will be somewhat similar to those shown in FIGS. 6 and 9.

While particular embodiments of the invention have been illustrated, it will be understood that the applicant does not wish to be limited thereto since modifications will now be suggested to those skilled in the art. For example, although a pure resistance is preferred for isolating the input from the tuned circuit phase response in the FIG. 1 configuration, the function of resistor 18 may be provided by other impedance devices such as a capacitor or inductor. Variable resistor 24 also may be replaced by another type impedance device, such as a coil having a variable tap. In addition, other frequency selective means may be employed in lieu of parallel resonant circuit 10, such as a crystal, cavity, magnetostrictive device or reed relay tuned to antiresonance at the desired pass frequency. With regard to the FIG. 11 configuration, clearly the series connections of filter 38 and amplifier 20 may be reversed, and other types of frequency dependent phase shift networks or devices may be used in lieu of all-pass filter 38. Applicant, therefore, contemplates by the appended claims to cover all such modifications as fall within the true spirit and scope of his invention.

What is claimed is:

1. A tone sensing circuit for responding to a single tone of predetermined frequency comprising, in combination, a signal input means, a first detector, a circuit including a phase inverter and means having a frequency dependent response characteristic serially connected between said signal input means and the input of said first detector, a first impedance device connected between said signal input means and the output of said last-mentioned circuit, said first impedance device having a variable tap adjusted to the position at which a voltage null occurs when said tone sensing circuit is receiving a single tone at said predetermined frequency, a second detector having an input coupled to the variable tap of said first impedance device, and means for combining the outputs of said first and second detectors to provide a composite output signal.

2. A tone sensing circuit according to claim 1 wherein said means having a frequency dependent response characteristic comprises means for producing a phase shift in the signal passing therethrough for all input signal frequencies different than said predetermined frequency.

3. A tone sensing circuit according to claim 2 wherein said phase shift means comprises an all-pass filter.

4. A tone sensing circuit according to claim 1 wherein said means having a frequency dependent response characteristic comprises a frequency selective means tuned to anti-resonance at said predetermined frequency.

5. A tone sensing circiut according to claim 4 wherein said phase inverter is coupled between said signal input means and said frequency selective means, and the output of said frequency selective means is coupled to the input of said first detector.

6. A tone sensing circuit according to claim 4 wherein said phase inverter is coupled between said frequency selective means and the input of said first detector, and said first impedance device is connected between said signal input means and the output of said phase inverter, and further including means for providing isolation serially connected between said signal input means and said frequency selective means.

7. A tone sensing circuit according to claim 6 wherein said isolation means is a second impedance device.

8. A tone sensing circuit according to claim 7 further including an amplitude threshold detector having an input to which said composite output signal is applied.

9. A tone sensing circuit according to claim 7 wherein said first and second detectors are adapted to provide respective output voltages of opposite polarity.

10. A tone sensing circuit according to claim 9 wherein each of said detectors has a reference terminal and a signal output terminal, and said means for combining said detector outputs comprises means connecting the reference terminal of said second detector to a source of reference potential and means connecting the signal output terminal of said second detector to the reference terminal of said first detector, said composite output signal thereby being provided at the signal output terminal of said first detector.

11. A tone sensing circuit according to claim 9 wherein said means for combining said detector outputs comprises a voltage summing circuit having two inputs respectively connected to the outputs of said first and second detectors.

12. A tone sensing circuit according to claim 7 wherein said frequency selective means is a parallel resonant circuit.

13. A tone sensing circuit according to claim 12 wherein said first impedance device is a variable resistor.

14. A tone sensing circuit according to claim 13 wherein said second impedance device is a resistor, and said parallel resonant circuit produces a phase shift in the signal applied to said phase inverter for all input signal frequencies different than said predetermined frequency, said phase shift increasing to selected maximum phase shift as the difference between the input signal frequency and said predetermined frequency increases.

15. A tone sensing circuit according to claim 14 wherein said first and second detectors are adapted to provide respective output voltages of opposite polarity.

16. A tone sensing circuit according to claim 15 wherein said phase inverter is a first amplifier, and further including a second amplifier coupled between said variable tap and the input of said second detector and having a gain sufficient to produce an output voltage from said second detector which when combined with the output voltage from said first detector provides a composite output signal having the polarity of the output voltgae from said second detector or a zero voltage level when said tone sensing circuit is receiving a signal containing one or more frequencies outside the passband of said parallel resonant circuit.

17. A tone sensing circuit according to claim 16 further including an amplitude threshold detector to which said composite output signal is applied.

18. A tone sensing circuit according to claim 17 wherein each of said detectors has a reference terminal and a signal output terminal, and said means for combining said detector outputs comprises, means connecting the reference terminal of said second detector to a source of reference potential, means connecting the signal output terminal of said second detector to the reference terminal of said first detector, and means coupling the signal output terminal of said first detector to the input of said ampiltude threshold detector.

19. A tone sensing circuit according to claim 17 wherein said means for combining said detector outputs comprises a voltage summing circuit having two inputs respectively connected to the outputs of said first and second detectors and an output terminal coupled to the input of said amplitude threshold detector.

References Cited

UNITED STATES PATENTS 2,951,973 9/1960 Atkinson ---------- 328—138 X

ROY LAKE, Primary Examiner

J. B. MULLINS, Assistant Examiner

U.S. Cl. X.R.

328—138, 167